H. MORE.
PORTABLE MILK-STRAINER.
No. 185,866. Patented Jan. 2, 1877.
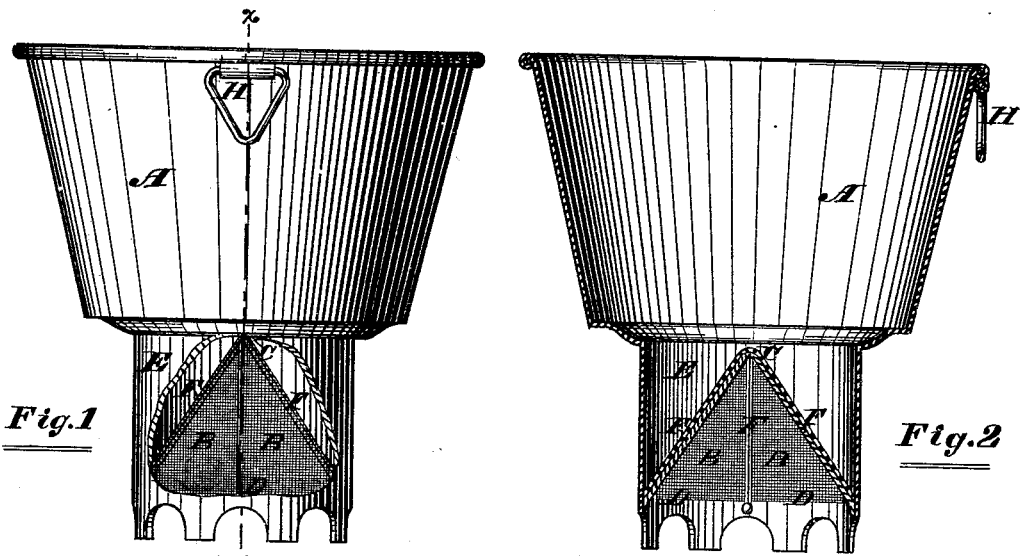
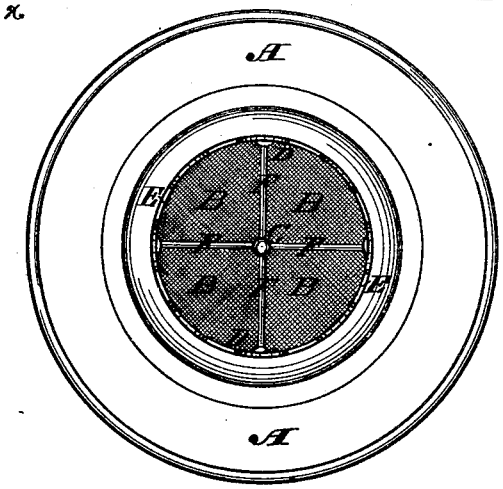
Attest  
D. Harry Hammer  
M. D. Flaherty
Inventor:  
Hiram More

UNITED STATES PATENT OFFICE.

HIRAM MORE, OF CHICAGO, ILLINOIS.

IMPROVEMENT IN PORTABLE MILK-STRAINERS.

Specification forming part of Letters Patent No. 185,866, dated January 2, 1877; application filed November 23, 1876.

*To all whom it may concern:*

Be it known that I, HIRAM MORE, of the city of Chicago, county of Cook, and State of Illinois, have invented a certain new and useful Improvement in Conical Strainers; and I do hereby declare that the following is a full, clear, and exact description of the said invention, reference being had to the accompanying drawing, making a part of this specification, in which—

Figure 1 is a side view with portions of lower side broken away. Fig. 2 is a cross-section on line X X of Fig. 1. Fig. 3 is a bottom view of the strainer.

Similar letters of reference indicate corresponding parts in all of the figures.

To enable others skilled in the art to make and use this invention I will proceed to describe the same.

A A is the receiver, with the attachment E E. B B is the wire-cloth composing the strainer. F F represent the wires for the support of the cloth. Said wires are fastened at D D, forming the point at C. H represents a handle by which the strainer can be hung up. The receiver is made of tin or other light metal, and the strainer can be made of the finest brass wire-cloth, with at least ten thousand perforations or apertures to the square inch.

This strainer can be used in ordinary milk-cans or otherwise, as desired.

In a conical strainer, the liquid, as it passes in, frees itself from all sediment, and the liquid passes through unobstructed, while the sediment is crowded to the bottom by the pressure of the liquid.

The sediment is easily removed by reversing the strainer and allowing water to pass through from the outer side.

This strainer is more especially intended for straining milk and other liquids.

Now, what I claim as new, and desire to secure by Letters Patent of the United States, is—

A portable receptacle, A, adapted to stand upon its own feet, or to rest in the mouth of an ordinary milk-can, and provided with a conical strainer, B, and suitable supporting-frame F, substantially as set forth.

HIRAM MORE.

Witnesses:
D. HARRY HAMMER,
M. D. FLAHERTY.